US011140149B2

(12) United States Patent
Friel

(10) Patent No.: US 11,140,149 B2
(45) Date of Patent: Oct. 5, 2021

(54) ZERO-TOUCH BOOTSTRAP OF AN ENDPOINT WITHOUT ADMIN PRE-PROVISIONING

(71) Applicant: Cisco Technology, Inc., San Jose, CA (US)

(72) Inventor: Owen Brendan Friel, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 292 days.

(21) Appl. No.: 16/227,798

(22) Filed: Dec. 20, 2018

(65) Prior Publication Data
US 2020/0204538 A1 Jun. 25, 2020

(51) Int. Cl.
H04L 29/06 (2006.01)

(52) U.S. Cl.
CPC ........ *H04L 63/0823* (2013.01); *H04L 63/166* (2013.01)

(58) Field of Classification Search
None
See application file for complete search history.

(56) References Cited

U.S. PATENT DOCUMENTS

| 8,385,916 | B2 | 2/2013 | Raleigh | |
|---|---|---|---|---|
| 8,478,667 | B2 | 7/2013 | Raleigh | |
| 2013/0072149 | A1 | 3/2013 | Raleigh | |
| 2013/0219456 | A1* | 8/2013 | Sharma | G06F 16/188 726/1 |
| 2013/0318343 | A1* | 11/2013 | Bjarnason | H04L 63/08 713/157 |
| 2015/0222604 | A1* | 8/2015 | Ylonen | G06F 21/575 713/171 |

OTHER PUBLICATIONS

M. Pritikin et al., "Bootstrapping Remote Secure Key Infrastructures (BRSKI) draft-ietf-anima-bootstrapping-keyinfra-07", https://tools.ietf.org/html/draft-ietf-anima-bootstrapping-keyinfra-07, Jul. 3, 2017, 61 pages.
Google, "Install your Meet or Chromebox system", https://support.google.com/chromedevicesformeetings/answer/4525672?hl=en, downloaded Dec. 20, 2018, 8 pages.
Google, "Enroll your device", https://support.google.com/chromedevicesformeetings/answer/6109380?visit_id=636717559026926389-246391828&rd=1, downloaded Dec. 20, 2018, 2 pages.
J. Decker et al., Microsoft, "First-run program (Surface Hub)", Jul. 26, 2017, 26 pages.

* cited by examiner

Primary Examiner — Brandon S Hoffman
(74) Attorney, Agent, or Firm — Edell, Shapiro & Finnan, LLC

(57) ABSTRACT

An authorized local domain service (ALDS) is deployed in a local network and is authorized to provision endpoints with a cloud-based service on behalf of an organization. The ALDS receives, from a local domain service (LDS) deployed in the local network and configured to connect with and register endpoints in the local network for communications on behalf of the organization, an identity of an endpoint acquired by the LDS when the endpoint registered with the LDS. The ALDS identifies for the organization an account associated with the identity, creates in the cloud-based service for the organization an association between the identity and the account, and notifies the endpoint via the local domain service to onboard against the cloud-based service for access to the cloud-based service.

20 Claims, 8 Drawing Sheets

ZERO-TOUCH BOOTSTRAP OF AN ENDPOINT WITHOUT ADMIN PRE-PROVISIONING

TECHNICAL FIELD

The present disclosure relates to provisioning endpoint devices for a cloud-based service.

BACKGROUND

Conventionally, endpoint devices associated with accounts in an organization need to be pre-provisioned individually on a cloud-based service, such as a collaboration service, before the endpoint devices can access services on the cloud-based service. Typically, the pre-provisioning is performed by an administrator. The administrator pre-provisions each endpoint device against the cloud-based service, individually. Given that the endpoint devices may number in the thousands, such pre-provisioning is time-consuming and prone to error.

DESCRIPTION OF EXAMPLE EMBODIMENTS

Overview

Figure 1:
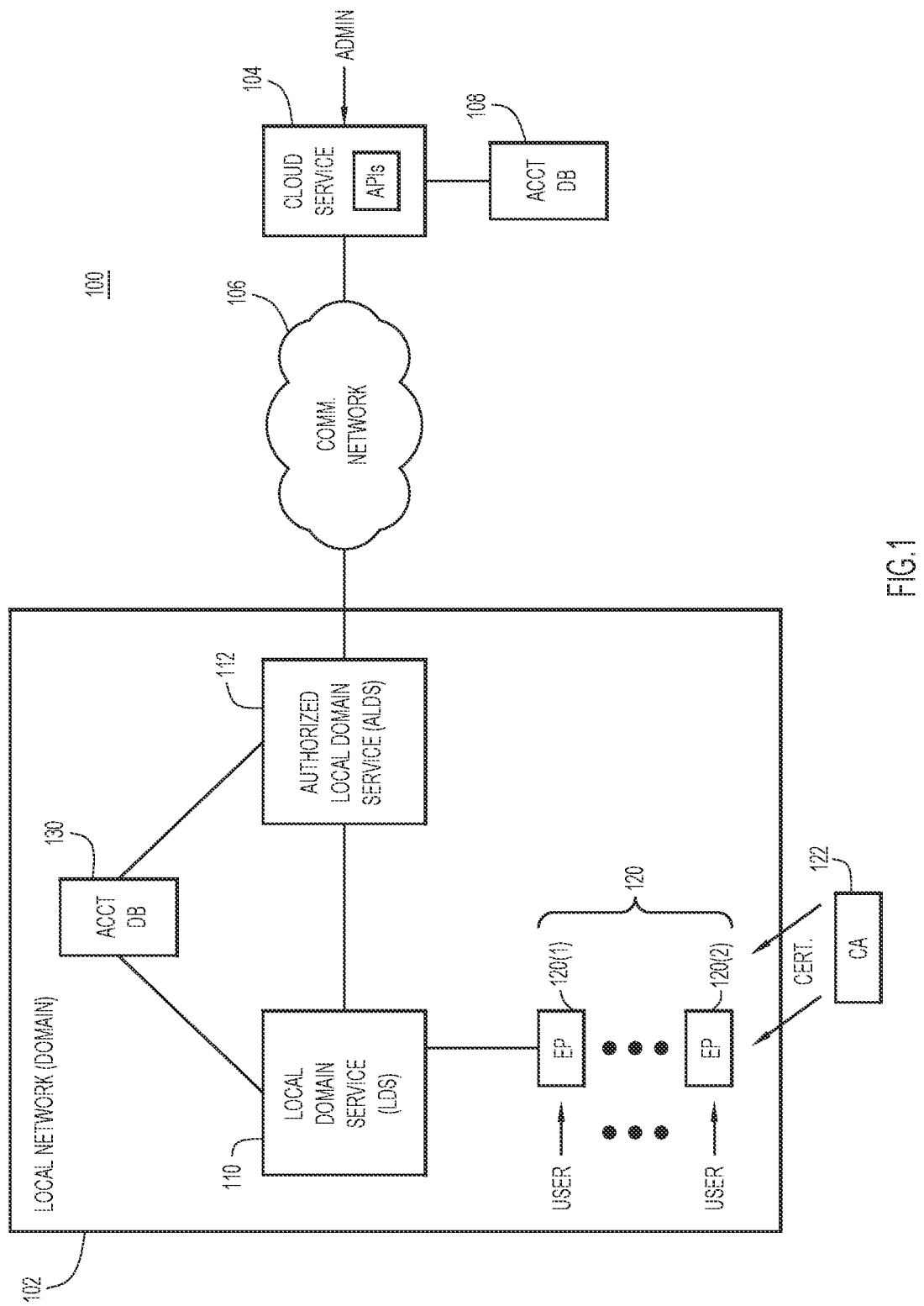
FIG. 1 is a block diagram of a network environment in which zero-touch (ZT) bootstrapping of endpoints for a cloud-based service (also referred as a "cloud service"), without per-device administrative provisioning, may be implemented, according to an example embodiment.

A method is performed by an authorized local domain service (ALDS) deployed in a local network and authorized to provision endpoint devices with a cloud-based service on behalf of an organization. The authorized local domain service receives, from a local domain service (LDS) deployed in the local network and configured to connect with and register the endpoint devices in the local network for communications on behalf of the organization, an identity of an endpoint among the endpoints, wherein the identity was acquired by the local domain service when the endpoint registered with the local domain service. The authorized local domain service identifies for the organization an account associated with the identity, creates in the cloud-based service for the organization an association between the identity and the account, and notifies the endpoint via the local domain service to onboard against the cloud-based service for access to the cloud-based service.

Example Embodiments

Embodiments presented herein automate provisioning of a cloud-based service and endpoint devices (referred to simply as "endpoints") with respect to the cloud-based service, such that the endpoints may access services offered by the cloud-based service. The embodiments are referred to as "zero-touch (ZT) bootstrapping of endpoints leveraging network Transport Layer Security (TLS) connection assertions." The embodiments are "zero-touch" because they automatically bootstrap the endpoints without administrative pre-provisioning of the endpoints. The term "bootstrapping" means "provisioning" or "initially configuring" for operation with the cloud-based service.

The embodiments include a generalized zero-touch embodiment, and zero-touch first and second use cases that are covered by the generalized zero-touch embodiment. The first use case, "Zero-Touch for Teams," is directed to zero-touch bootstrapping of Webex Teams endpoints with no per-device administrative pre-provisioning. The second use case, "Cloud Aware," is directed to making existing endpoints connected to existing call control engines (e.g., Cisco Unified Communications (CUCM), Broadworks, or the Cisco Video Communication Server (VCS)) cloud aware with no per-device administrative pre-provisioning, where "cloud aware" means creating Teams account for the endpoints and automatically issuing to the endpoints a common identity (CI) token for Teams access.

In the generalized zero-touch embodiment, and in both zero-touch use cases, endpoints deployed in a local network domain (also referred to more simply as a "local network") need to be onboarded to a cloud-based service (also referred to as a "cloud service") (e.g., Webex Teams, by Cisco) without admin pre-provisioning of the endpoint. The endpoints need to be onboarded before the endpoints can access services offered by the cloud service. Typically, the local network is owned and/or operated by, or otherwise associated with, a particular organization. The term "onboarded" means to provision the endpoints and the cloud service with information that enables the endpoints to access the services of the cloud service subsequent to being onboarded.

Both zero-touch use cases may use a known local domain service deployed in the local network to assist with the onboarding. The Zero Touch for Teams use case employs a Bootstrapping Remote Secure Key Infrastructures (BRSKI) Internet-of-Things (IoT) Registrar function as the local domain service. The Cloud Aware use case employs either a call control engine (also referred to more simply as "call control") or a connector service as the local domain service.

The first and second use cases leverage a common set of building blocks/operations:

1. A trusted entity is deployed in a local network that is authorized to call cloud service application specific interfaces (APIs) on behalf of an organization.
2. Endpoints connect to the local domain service and establish a secure TLS connection to the local domain service.
3. The endpoints have a manufacturer installed certificate ("cert") (MIC) or Initial Secure Device Identifier (IDevID).

4. The endpoints may optionally be configured with a Locally Significant Cert (LSC) identifier (LDevID).
5. An administrator of the cloud service provisions the cloud service to trust only the endpoint certificate authority (CA) issuer (e.g., MIC root or LSC root as appropriate) for the organization.
6. The administrator provisions the cloud service to trust only endpoints that assert they are connected to the local domain service.
7. The trusted entity discovers endpoints in the local network that need to be provisioned on the cloud service.
8. The trusted entity creates accounts (if necessary) on the cloud service for the endpoints.
9. The trusted entity assigns specific endpoints to specific accounts on the cloud service.
10. The trusted entity notifies the endpoints to onboard against the cloud service.
11. The endpoints perform mutual TLS (MTLS) with the cloud service using, for example, application layer TLS (ATLS).
12. The endpoints send respective network-TLS-connection-assertions to the cloud service, e.g., the endpoints tell the cloud service public key infrastructure (PKI) the identity certs of the local domain service to which the endpoints established TLS connections. In one example, an identity cert may include an exact cert. In another example, the identity cert may include a combination of an exact cert and a full chain of certs.
13. For each endpoint from (12), the cloud service verifies/tests that (i) the organization trusts the CA that issued the endpoints cert, (ii) the endpoint is assigned to an account in the organization, and (iii) the organization trusts the local domain service to which the endpoint is connected.
14. For each endpoint from (13), assuming all verification tests pass, the cloud service issues to the endpoint access tokens for calling cloud service APIs. Otherwise, the cloud service does not issue the access tokens.

The zero-touch provisioning enables an enterprise/organization to roll out cloud service (e.g., Webex Teams) connected endpoints (e.g., Webex Boards and Webex Room Systems) without any pre-provisioning of the endpoint on the cloud service by the administrator of the organization or by cloud service operations, and without requiring an installer of the endpoints to have to perform any action other than to power up the endpoint, e.g., unbox and plug-in the endpoints, which then automatically register against the organization on the cloud service in an automatically created account The zero-touch provisioning also enables Cloud Aware features such as One-Button-to-Push (OBTP) for already onboarded CUCM, VCS and Broadworks connected endpoints without requiring any pre-provisioning of the endpoint on the cloud service, and without requiring a user to have to re-onboard the endpoint, enter an activation code, or perform any similar setup steps.

In the ensuing description, the generalized zero-touch embodiment will be described in connection with FIGS. 1 and 2. Then, the zero-touch first and second use cases covered by the generalized zero-touch embodiment will be described in connection with FIGS. 3A and 3B and FIG. 4, respectively.

With reference to FIG. 1, there is a block diagram of a network environment 100 in which the generalized zero-touch embodiment (and the zero-touch first and second use cases) may be implemented. Environment 100 includes a local network 102 associated with an organization, a cloud-based service 104 (i.e., a cloud service 104), and a communication network 106 connected to the local network and the cloud service. Network 106 may include wired or wireless local area networks (LANs) and wired or wireless wide area networks (WAN), such as the Internet.

Cloud service 104 may include any cloud-based service that supports network-based communication sessions between endpoints that are authorized to use the cloud service. For example, cloud service 104 may include services that control and/or are responsive to different types of Internet-of-Things (IoT) devices, such as remote sensors, and the like. Cloud service 104 may also support collaboration services, such as user conference services, collaboration meeting rooms, personal meeting rooms, chat rooms, voice-over-IP calls, texting, and so on. An example of a collaboration service includes Webex Teams. Cloud service 104 includes APIs coupled with respective services and utilities of the clouds service and through which the cloud service may be configured/provisioned, and through which the cloud service supports communication sessions for and between endpoints. For example, an authorized external actor deployed in local network 102 may call the APIs over network 106 to invoke the respective services and utilities to configure and/or provision the cloud service through the APIs, as will be described more fully below. Call service 104 includes or has access to an account database (DB) 108 that stores information for accounts for users or devices/machines associated with the organization who/that are authorized for access to the cloud service. Examples of accounts include, but are not limited to, user accounts for personal endpoints (i.e., accounts for users of endpoints), machine accounts for conference rooms or shared space endpoints, and machine accounts for IoT devices, such as sensors. The machine accounts may not be associated with a specific user. Cloud service account database 108 includes entries for the accounts. Each entry identifies the respective account (e.g., includes an account identifier (ID)), may identify an individual user or a group of users associated with the account (e.g., includes user ID(s)), and identifies one or more of endpoints associated with/authorized under the account (e.g., includes an endpoint ID). In this way, each entry associates identities of accounts with corresponding identities of endpoint devices.

Local network 102 may include one or more LAN-based or other types of networks owned and/or operated by or on behalf of the organization, i.e., the local network may be an enterprise network for the organization. Local network 102 includes a local domain service (LDS) 110, an authorized LDS (ALDS) 112 connected to the LDS, and endpoints (EPs) 120(1)-120(N) (collectively referred to as endpoints 120) configured to connect wirelessly or over a wired connection to the LDS. LDS 110, ALDS 112, and endpoints 120 may communicate with cloud service 104 over network 106 through a router or switch, e.g., a gateway router, not shown. ALDS 112 may be hosted on a computer platform as a stand-alone application, or may be integrated with LDS 110.

Endpoints 120 may each take on a variety of forms, including a SmartPhone, tablet, laptop computer, desktop computer, video conference endpoint, voice-over-Internet Protocol (IP) phone, Webex Board, Webex room system, IoT device, and the like. Endpoints 120 are typically configured with respective certificates issued to the endpoints by a certificate authority (CA) 122 authorized/trusted by the organization, or with MICs. Endpoints 120 are associated with accounts associated with the organization. To support the accounts, LDS 110 or a separate server hosts a local network account database 130 accessible to the LDS and, optionally, ALDS 112. Account database 130 includes entries for respective ones of the accounts. Each entry identifies the respective account (e.g., includes an account identifier (ID)), may identify an individual user or a group of users associated with the account (e.g., includes user ID(s)), and identifies one or more of endpoints 120 associated with/authorized under the account (e.g., includes endpoint identifiers/identities).

LDS 110 connects to and registers endpoints 120 for communication on behalf of the organization and supports communication services for the registered endpoints. LDS 110 may create and maintain accounts in account database 130. LDS 110 may include applications such as CUCM, Broadworks, or VCS, for example.

In accordance with embodiments presented herein, ALDS 112 operates as an intermediary or connector between LDS 110 and cloud service 104 to automate provisioning of endpoints 120 on the cloud service for access to the cloud service, i.e., to provide ZT provisioning. This ZT provisioning obviates the need for individual pre-provisioning of endpoints 120, either manually or otherwise. Thus, ALDS 112 may be considered a "hybrid service" between LDS 110 and cloud service 104. To this end, ALDS 112 is authorized to call the above-mentioned APIs of cloud service 104 to provision endpoints 120 on behalf of the organization.

Figure 2:
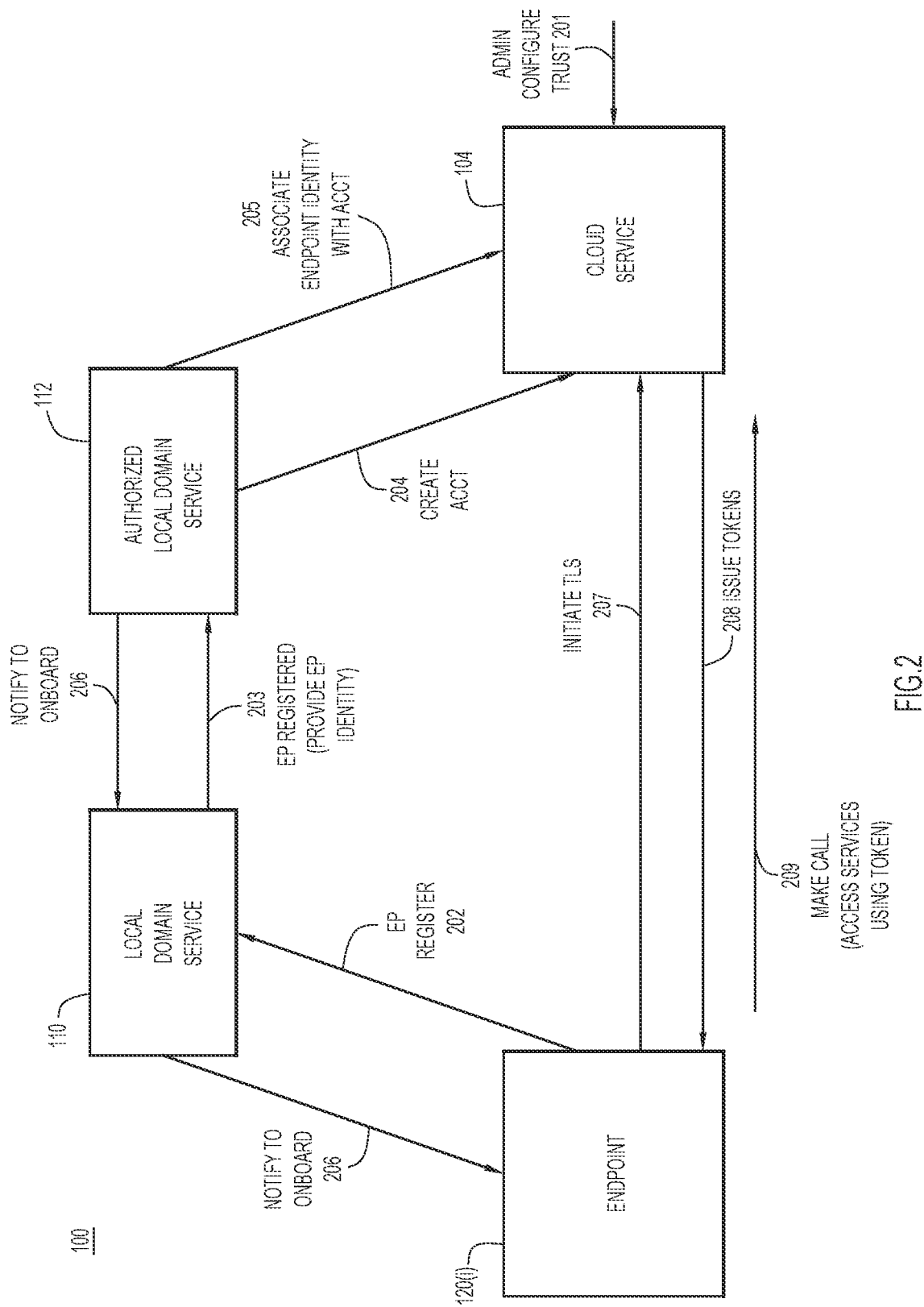
FIG. 2 shows operational flows of a generalized method of zero-touch provisioning performed in the network environment, according to an example embodiment.

With reference to FIG. 2, there is an illustration of example operational flows 201-209 for the generalized zero-touch embodiment performed in environment 100. The operational flows are described with respect to an example in which local network 102 is operated on behalf of an example organization named "Ford," LDS 110 includes Ford's CUCM, and endpoints 120 may include IP phones.

At 201, an administrator (e.g., an administrative function) of cloud service 104 configures trust on the cloud service via an API of the cloud service. That is, cloud service 104 receives trust information from the administrator that the cloud service stores locally, and that causes the cloud service to trust various entities. Specifically, the administrator configures cloud service 104 to:

1. Trust ALDS 112, e.g., to trust Ford's hybrid service. To establish the trust, cloud service 104 may issue a trust token to ALDS 112 that the ALDS uses subsequently in communication with the cloud service to invoke APIs on the cloud service.
2. Trust CA 122 that issues certificates to endpoints 120 on behalf of the organization, or trust the manufacturer's CA. For example, this trust may trust Ford's private CA that issues LSCs to endpoints 120. The following is an example of an endpoint certificate for an IP phone:
Certificate:
　Data:
　　Version: 3 (0x2)
　　Serial Number: 33:0c:58:18:00:00:00:0e:96:39
　　Signature Algorithm: sha256WithRSAEncryption
　　Issuer:
　　　CommonName=<Company name> Man. CA SHA2
　　　OrganizationName=<Company name>
　　Validity
　　　Not Before: October 12 12:58:21 2015 GMT
　　　Not After: October 12 13:08:21 2025 GMT
　　Subject:
　　　CommonName=CP-8865-SEPAC7E8AB7D7FD
　　　OrganizationalUnitName=<Company name>
　　　OrganizationName=<Company name>
3. Trust endpoints among endpoints 120 that have registered with/connected to LDS 110, e.g., trust endpoints registered to Ford's CUCM.

At 202, an endpoint among endpoints 120 connects to/registers with LDS 110 over a TLS connection. The endpoint may establish multiple connections with LDS 110 to register with the LDS, but one of the connections should be a TLS connection, to enable the endpoint to record a TLS identity certificate of LDS 110 received from the LDS over the TLS connection. For example, an IP phone registering (prior to making a call) to Ford's CUCM may establish both Hypertext Transfer Protocol (HTTP) and Session Initiation Protocol (SIP) connections, such that the SIP connection is over Transmission Control Protocol (TCP), and the HTTP connection is over TLS. The endpoint records the TLS identity certificate of LDS 110.

At 203, ALDS 112 automatically discovers (i.e., discovers without any manual intervention) that the endpoint has connected to LDS 110. For example, responsive to the above-mentioned connection(s) between the endpoint and LDS 110, the LDS may send to ALDS 112 a message that indicates (i) the endpoint has registered with the LDS, and (ii) an identity of the endpoint (i.e., endpoint identity). The endpoint identity is information that is embedded in or derived from the endpoint cert, and may include a MAC address of the endpoint (e.g., that is embedded in the common name of the cert, or in an MIC programmed in the endpoint), the cert serial number, cert subject common name, cert subject serial number, or a hash of the cert. As will be described below, an endpoint identity is an identity that the associated endpoint can assert to cloud service 104 via TLS, and that the cloud service can verify as trusted.

LDS 110 may also send to ALDS 112 the identity of an account associated with the endpoint identity, as stored in account database 130. Alternatively, ALDS 112 may use the endpoint identity to search account database 130 for the account associated with the endpoint, e.g., indexed by the endpoint identity. The account may indicate that the endpoint is a personal endpoint (e.g., an individual account) assigned for use to an individual, e.g., MAC address MACxyz is assigned to Ford user1 under an account user1@Ford.com. Alternatively, the account may indicate the endpoint is a shared endpoint (i.e., a shared account) assigned for use to multiple individuals, e.g., MAC address MACabc is assigned to Ford shared group1 under account sharedgroup1@Ford.com. In an example using Webex teams, the associated account may represent a shared space device, such as a hot desk phone.

Assuming operation 203 repeats for each of endpoints 120 that registers with LDS 110, e.g., for 1,000 endpoints, ALDS 112 learns the endpoint identities and associated accounts for all 1,000 endpoints. Some of the accounts may be individual accounts, while others may be shared accounts. Armed with the accounts and their associated endpoint identities discovered at 203, ALDS 112 automatically provisions cloud service 104 with the discovered information for each LDS registered endpoint via API calls to cloud service 104 at next operations 204 and 205, as described below.

At 204, in a fully automated fashion, without manual intervention, ALDS 112 interacts with cloud service 104 via API calls to determine, for each account discovered at 203, whether a parallel account already exists on cloud service 104, e.g., in cloud service account database 108. For each endpoint, if the account does not already exist on cloud service 104, ALDS 112 automatically creates the account on the cloud service, e.g., in account database 108. For example, if the discovered account is an individual account, ALDS 112 creates a parallel individual account on cloud service 104. Alternatively, if the discovered account is a shared account, ALDS 112 creates a parallel shared account on cloud service 104. In both cases, cloud service 104 stores the created account in cloud service account database 108. If the parallel account already exists on cloud service 104, ALDS 112 does not need to create the parallel account.

At 205, using API calls to cloud service 104, ALDS 112 assigns to each (parallel) account on cloud service 104, whether pre-existing or created on the cloud service at 204, the associated endpoint identity discovered at 203. When the endpoint identity includes a MAC address, ALDS 112 associates the endpoint MAC address discovered at 203 with the account. For example, ALDS 112 associates MAC addresses MACxyz and MACabc with accounts user1@Ford.com and sharedgroup1@Ford.com on cloud service 104, respectively. In an example for CUCM and Teams, the MAC address may be embedded in a device MIC/LSC, so that cloud service 104 can cryptographically prove a device identity during a TLS handshake.

At 206, via LDS 110, ALDS 112 notifies each endpoint, for which the ALDS associated an endpoint identity with an account on cloud service 104 at operation 205, to onboard against the cloud service. In other words, ALDS 112 notifies each endpoint that it is provisioned in cloud service 104 and to register with the cloud service. To do this, for each endpoint, ALDS 112 sends a notification message to LDS 110. In turn, LDS 110 sends a corresponding notification message to the endpoint.

At 207, each endpoint notified at 206 initiates a respective mutual TLS handshake with cloud service 104, using an application layer TLS (ATLS), although regular TLS may also be used. Thus, cloud service 104 establishes a respective endpoint-initiated TLS connection with each endpoint. Each endpoint presents to cloud service 104 (and the cloud service receives) via the connection the following respective endpoint information:
1. The TLS identity certificate of LDS 110 that the endpoint recorded at 202, e.g., the cert identity of Ford's CUCM.
2. An endpoint identity, e.g., a MAC address of the endpoint, such as MAC address MACxyz or MACabc.
3. The CA that issued the certificate to the endpoint, e.g., the identity of CA 122, such as Ford's CA.

At 208, for each endpoint that initiates a TLS connection to cloud service 104 at 207, cloud service 104 determines whether the endpoint is a trusted endpoint based on comparisons between corresponding portions of the trust information configured on the cloud service at 202 and the endpoint information presented by the endpoint to the cloud service at 207. That is, cloud service 104 validates the endpoint information against the trust information. To validate the endpoint information, cloud service 104 tests whether:
1. The endpoint is connected to an LDS that is trusted, i.e., the presented LDS matches a trusted LDS, e.g., the endpoint is connected to Ford's CUCM.
2. The presented endpoint identity is assigned to an account on the cloud service, i.e., the presented identity is associated with an account, e.g., that MACxyz is assigned to a Ford account. Cloud service 104 searches account database 108 for the association between the endpoint identity and the account.
3. The presented endpoint certificate is issued by a trusted CA, e.g., the presented endpoint CA matches a trusted CA, e.g., the endpoint has Ford's CA certificate.

If all of tests (1), (2), and (3) pass, cloud service 104 authorizes the endpoint to access the services offered by the cloud service. For example, cloud service 104 issues one or more access tokens to the endpoint and that may be asserted by the endpoint to access the services (e.g., call APIs on the cloud service) in the future, for example, when the endpoint establishes a communication session using the cloud service.

At 209, an endpoint armed with access tokens issued by cloud service 104 at 208 establishes a communication session through the cloud service using the access tokens. To do this, the endpoint presents the access tokens to cloud service 104 while establishing a connection with the cloud service in support of a communication session.

Detailed call flows/transaction diagrams for the zero-touch first and second use cases are described next.

Figure 3A:
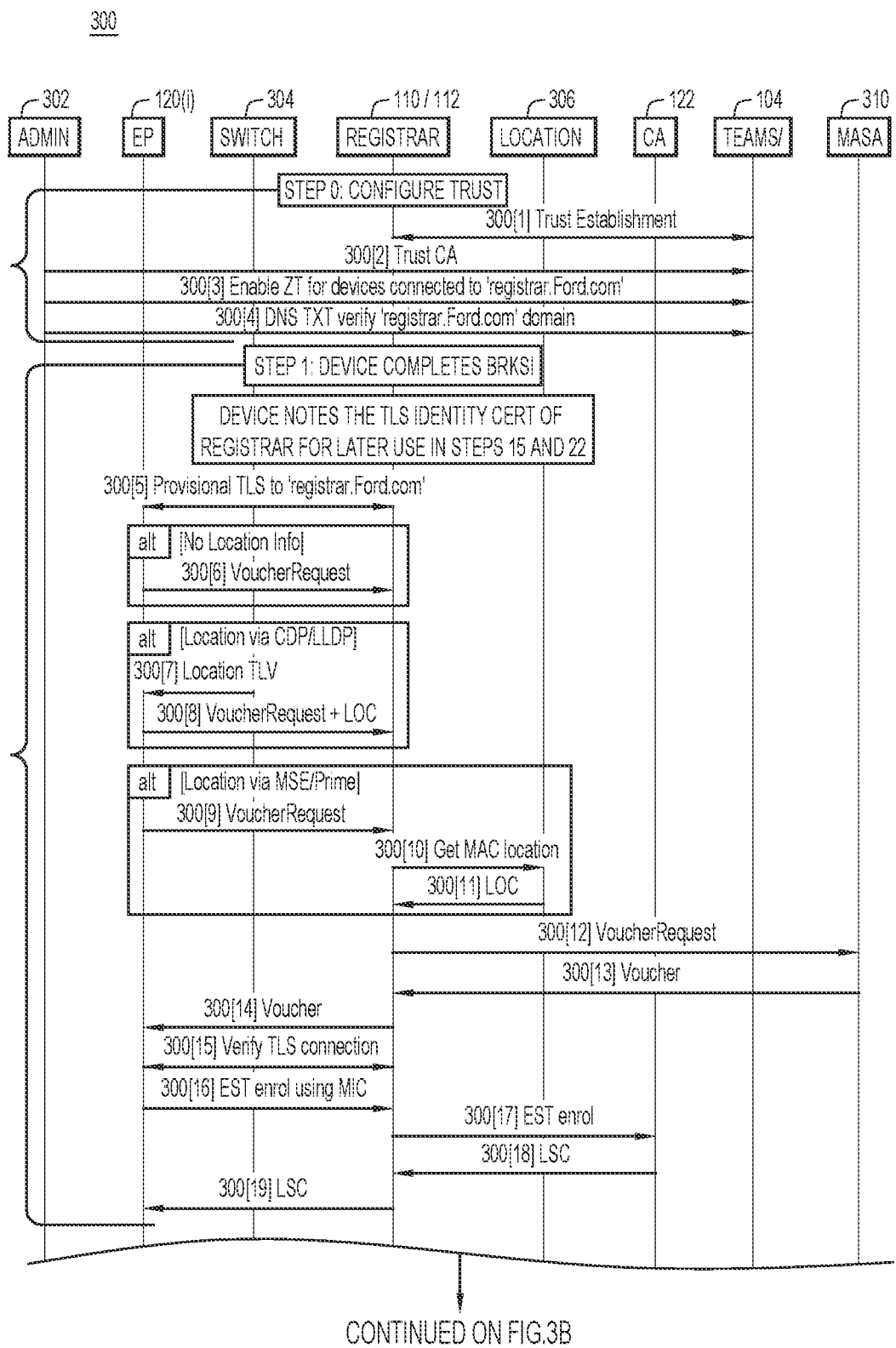
FIGS. 3A and 3B represent a call flow/transaction diagram for a first use case of zero-touch provisioning of the endpoints for the cloud service, according to an example embodiment.
Figure 3B:
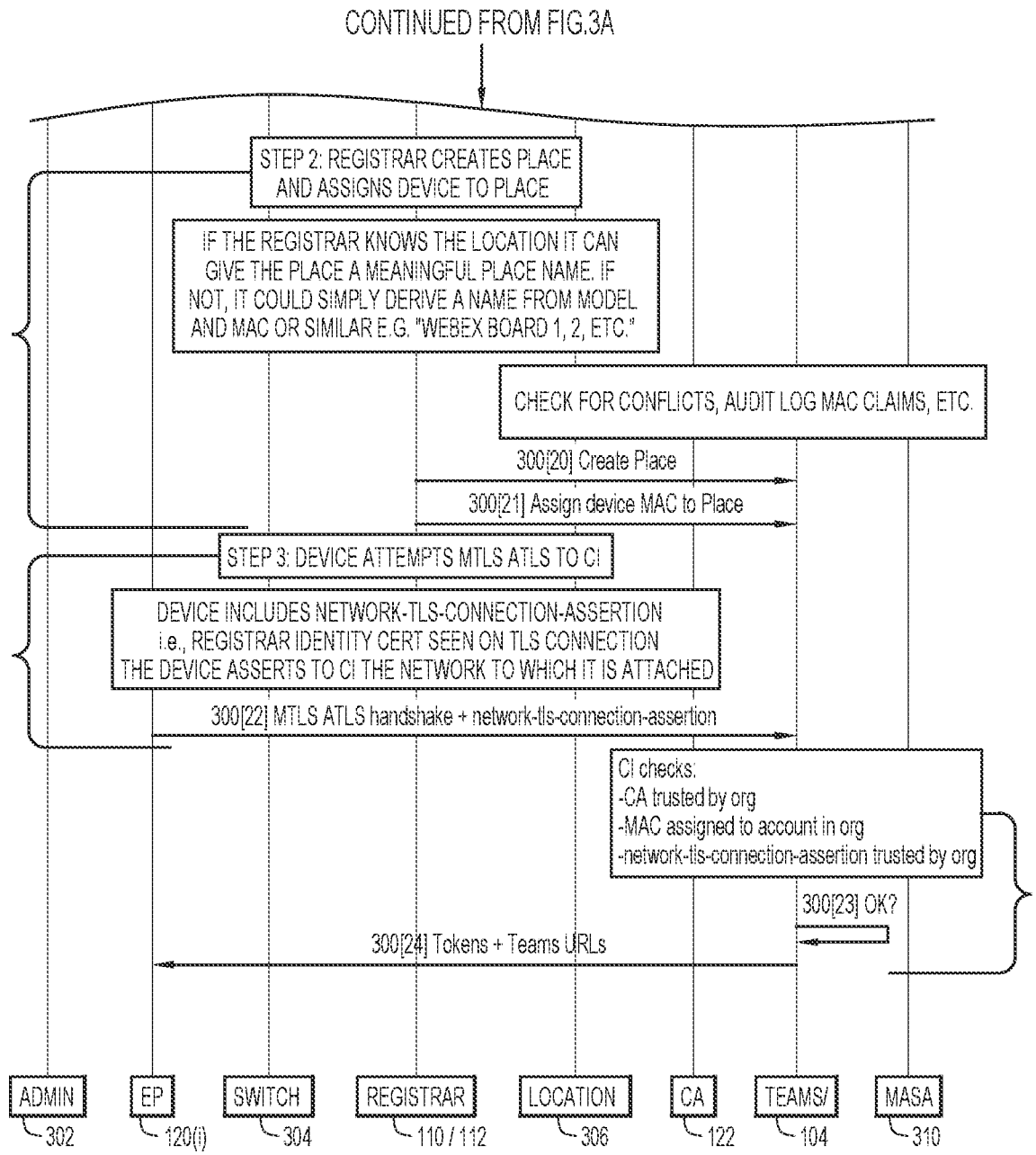

With reference to FIGS. 3A and 3B, there is an example call flow/transaction diagram 300 for the first use case, Zero Touch for Teams. Transaction diagram 300 shows transactions between the following actors identified at the top of FIG. 3A: an administrator (function) 302; an endpoint (e.g., endpoint 120(*i*)); a switch "Switch" 304 deployed in local network 102; a "Registrar" representing LDS 110 and ALDS 112 as an integrated application; a location service "Location" 306; certificate authority CA 122, which may be an on-premise or cloud CA; a "Teams" application representing cloud service 104; and a manufacturer authorized signing authority (MASA) 310.

At 300[1], the administrator establishes trust between the Registrar and Teams for an organization. The (trusted) Registrar can call Teams APIs on behalf of the organization.

At 300[2], the administrator configures Teams to trust the CA that issues endpoint certs. This may be a private CA root, a "Let's Encrypt root," or a company manufacturing root CA if the organization wants to use MICs.

At 300[3], the administrator enables zero-touch for endpoints that assert they are connected to the (trusted) Registrar, e.g., the administrator only allows endpoints connected to the 'registrar.Ford.com' registrar to zero touch onboard.

At 300[4], optionally, the administrator optionally forces domain verification (e.g., through a Domain Name System (DNS) service) for the Registrar domain, which would prevent a rogue organization from provisioning the Registrar domain of a trusted organization. This prevents an endpoint on a different local network from onboarding to a given organization, or an endpoint on the local network (e.g., local network 102) onboarding against a different organization.

At 300[5], the endpoint establishes a provisional TLS connection to the Registrar as per BRSKI. The three alternative "alt" boxes shown in FIG. 3A immediately under 300[5] present options for how a location of the endpoint may be discovered automatically, as follows:

For alt "No location info," at 300[6], no location information is available and the endpoint sends a BRSKI VoucherRequest to the Registrar.

For alt "Location via Cisco Discover Protocol (CDP)/Link Layer Discovery Protocol (LLDP)," at 300[7], the network switch/access point is configured to advertise location type-location-values (TLVs) in CDP/LLDP packets, and at 300[8], the endpoint sends a BRSKI VoucherRequest to the Registrar and includes location information discovered over CDP/LLDP in the request.

For alt "Location via Mobility Services Engine (MSE)/ Prime," at 300[9], the endpoint does not discover any location information in via CDP/LLDP, and simply sends a BRSKI VoucherRequest to the Registrar. At 300[10], the Registrar has a backend integration with a suitable location service (e.g. Mobility Services Engine or Prime Infrastructure) that the Registrar queries to determine accurate endpoint location. At 300[11], the location service returns the endpoint location.

At 300[12], the Registrar sends the VoucherRequest to the BRSKI MASA.

At 300[13], the MASA returns a signed Voucher instructing the endpoint to trust the Registrar.

At 300[14], the Registrar returns the Voucher to the endpoint.

At 300[15], the endpoint validates the provisional TLS connection to the Registrar.

At 300[16], the endpoint performs an enrollment over secure transport (EST) enroll against the Registrar to acquire an LSC.

At 300[17], the Registrar forwards the EST request to the CA.

At 300[18], the CA issues an LSC.

At 300[19], the Registrar returns the LSC to the endpoint.

At 300[20], the Registrar now knows that a new endpoint (e.g., a Webex endpoint) has successfully bootstrapped against the local network. The Registrar uses its trusted Teams integration to automatically create a "Place" for the endpoint. "Place" is a Webex term that represents a machine account for a space (e.g., collaboration space), such as a conference room, a reception desk, a shared space, and the like. If accurate location information is available for the endpoint, the Registrar can use that when creating the Place name, e.g. "GWY03-2-JB-KEANE." If not, the Registrar may simply derive a name from the endpoint model number and serial number or MAC address, e.g., "Webex Board ABC123."

At 300[21], the Registrar assigns the endpoint to the newly created Place. This could be performed via the endpoint MAC address, endpoint serial number, or any suitable endpoint identifier.

At 300[22], the endpoint attempts to complete ZT bootstrap by initiating a TLS connection at the application layer using ATLS against Teams. ATLS is used to avoid any TLS interception middle box issues. The endpoint includes a network-TLS-connection-assertion, i.e., the endpoint presents the identity cert of the Registrar that the endpoint previously received from the Registrar in the TLS connection to the Registrar.

At 300[23], Teams verifies that (i) the endpoint cert issuer is trusted by the organization, (ii) the endpoint identifier (e.g., MAC address) is assigned to an account in the organization, and (iii) the endpoint is connected to a Registrar that is trusted by the organization.

At 300[24], if all verification tests (i), (ii), and (iii) pass, Teams issues access tokens to the endpoint for Teams access via Teams APIs. Alternatively, if all of the verification tests do not pass, ZT fails, and Teams does not issue access tokens to the endpoint, in which case the endpoint can use manual provisioning.

Figure 4:
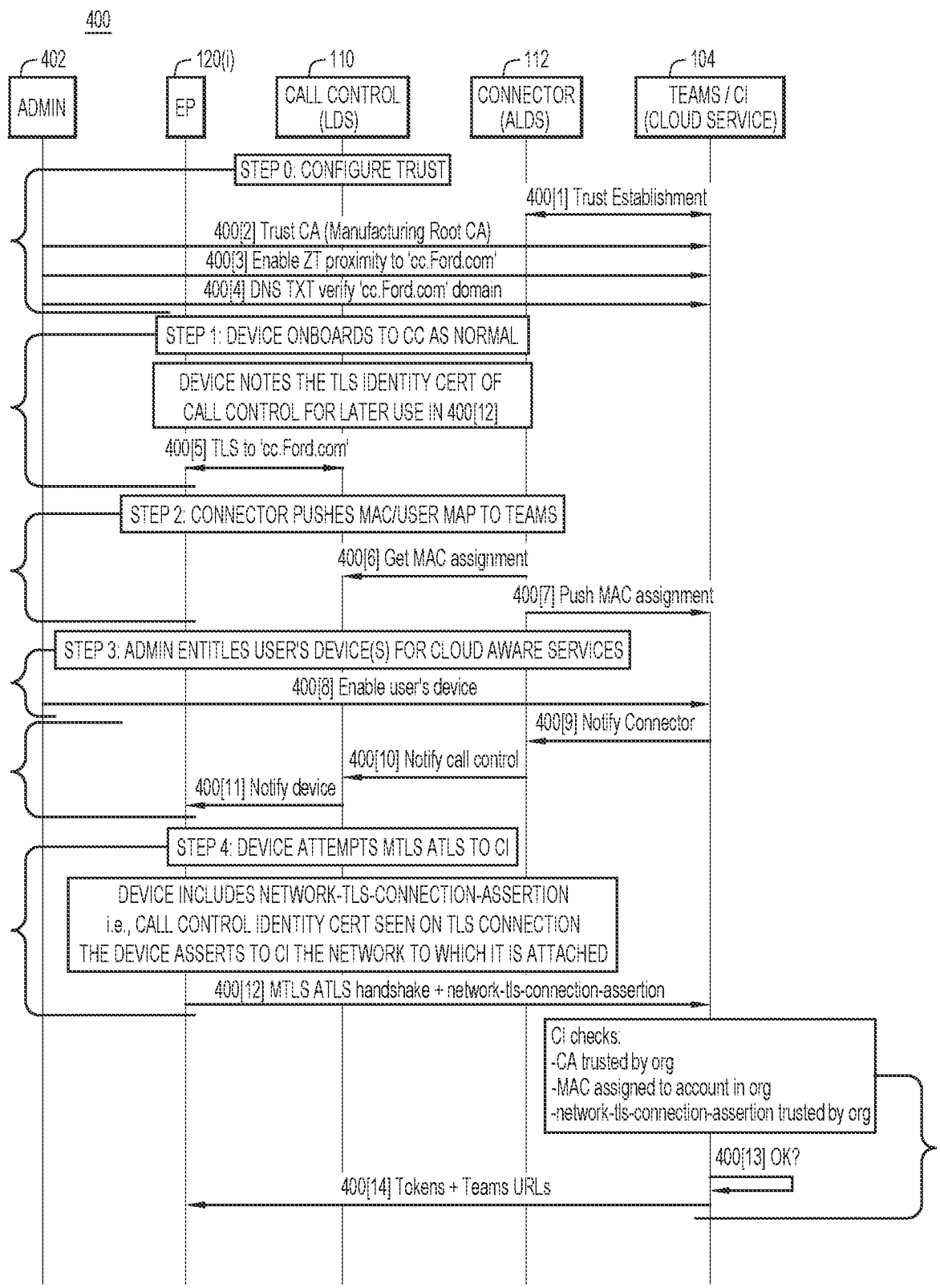
FIG. 4 is a call flow/transaction diagram for a second use case of zero-touch provisioning of the endpoints for the cloud service, according to an example embodiment.

With reference to FIG. 4, there is an example call flow/ transaction diagram 400 for the second use case, Cloud Aware. Transaction diagram 400 shows transactions between the following actors identified at the top of FIG. 4: an administrator (function) 402; an endpoint (e.g., endpoint 120(i)); Call Control (CC) representing LDS 110; Connector representing ALDS 112, and which may be integrated with the Call Connector; and a "Teams" application representing cloud service 104.

At 400[1], the administrator establishes trust between Connector and Teams, so that Connector can call Teams APIs on behalf of an organization.

At 400[2], the administrator configures Teams to trust the CA that issues endpoint certs to endpoints. The certs may be a MIC for most Cloud Aware instances; Certificate Authority Proxy Function (CAPF) issued certs may also be supported.

At 400[3], the administrator enables ZT Cloud Aware onboarding for endpoints that assert they are connected to (trusted) Call Control, e.g. the administrator only allows endpoints registered to the 'cc.Ford.com' Call Control to onboard.

At 400[4], the administrator may optionally force domain verification for the Call Control domain, which would prevent a rogue organization from provisioning the Call Control domain of a trusted, known organization, but may not be viable if the Call Control domain is private.

At 400[5], the endpoint has already onboarded against Call Control using whatever mechanism it normally uses. The endpoint employs at least one TLS connection to Call Control, and this connection will be asserted.

At 400[6], Connector retrieves from Call Control a list of all endpoints that are onboarded and which accounts, if any, the endpoints are associated with.

At 400[7], Connector pushes the endpoint identities (e.g. MAC addresses) to Teams and associates the endpoint identities with the correct accounts. If the endpoint is associated with a user, the endpoint identity can be associated with the user's Teams identity. If the endpoint is a shared space or meeting room endpoint, Connector may automatically create a Place/machine account for the endpoint.

At 400[8], if necessary, the administrator may explicitly license/entitle the endpoint for Cloud Aware Teams.

At 400[9]-400[11], the endpoint is notified that it is now provisioned and entitled for Cloud Aware.

At 400[12], the endpoint attempts to complete ZT bootstrap by initiating a TLS connection at the application layer using ATLS against Teams. The endpoint includes a network-TLS-connection-assertion, i.e., the endpoint includes the identity cert of Call Control that it received in the TLS connection to Call Control.

At 400[13], Teams verifies that (i) the endpoint cert issuer is trusted by the organization, (ii) the endpoint identifier (e.g. MAC address) is assigned to an account in the organization, and (iii) the endpoint is connected to a Call Control that is trusted by the organization.

At 400[14], if all verification steps (i), (ii), and (iii) pass, Teams issues access tokens to the endpoint for Teams access. Otherwise, Teams does not issue the access tokens.

Figure 5:
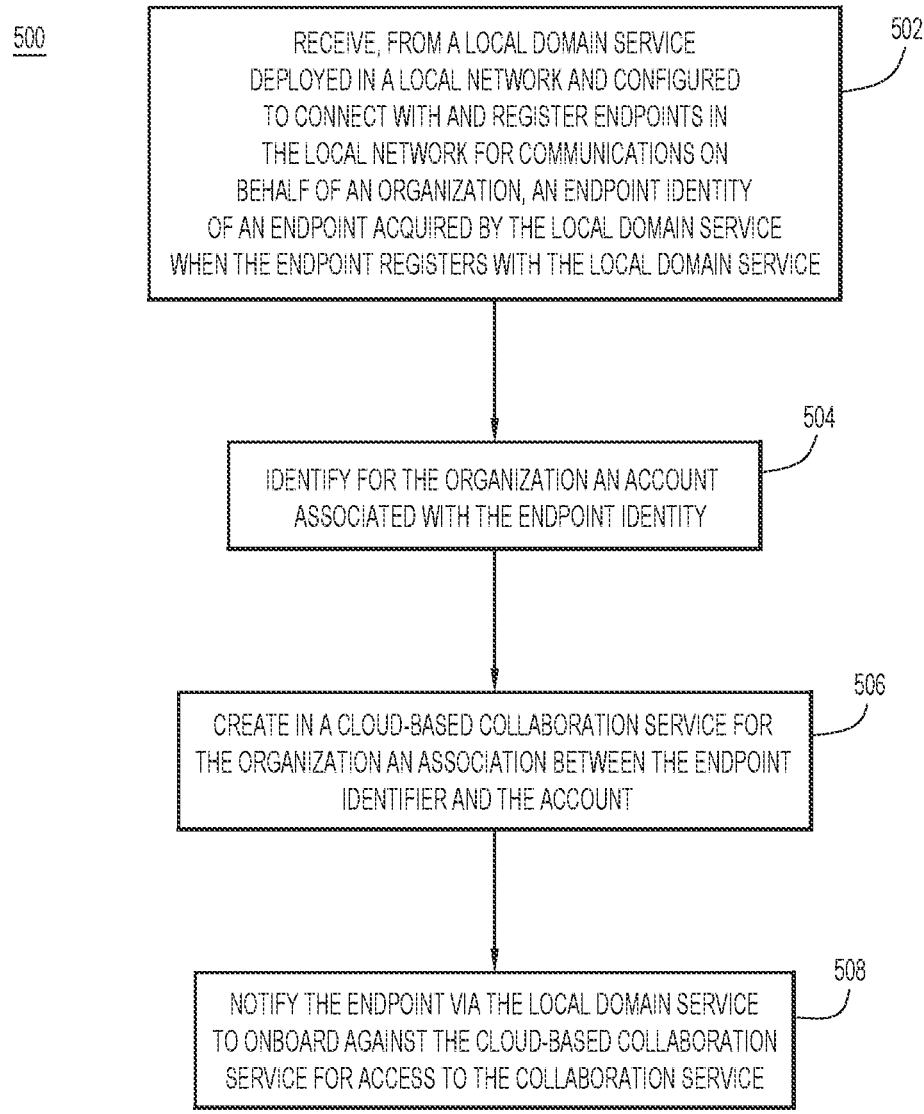
FIG. 5 is a flowchart of a method of zero-touch provisioning performed by an authorized local domain service (ALDS) deployed in a local network and that is authorized to communicate with the cloud service on behalf of an organization, according to an example embodiment.

With reference to FIG. 5, there is a flowchart of an example method 500 of zero-touch provisioning performed primarily by ALDS 112 on behalf of an organization. Method 500 is performed in an automated fashion without manual/administrator intervention, and without pre-provisioning of endpoints referenced in the method.

At 502, ALDS 112 receives, from LDS 110, an endpoint identity of an endpoint 120(i) acquired by the LDS when the endpoint registers with the LDS.

At 504, ALDS 112 identifies for the organization an account associated with the endpoint identity.

At 506, ALDS 112 automatically creates in cloud service 104 for the organization an association between the endpoint identifier and the account. ALDS 112 may first create the account on cloud service 104, if it does not already exist.

At 508, ALDS 112 notifies the endpoint via LDS 110 to onboard against cloud service 104 (e.g., register with the cloud service) for access to services of the cloud service.

Figure 6:
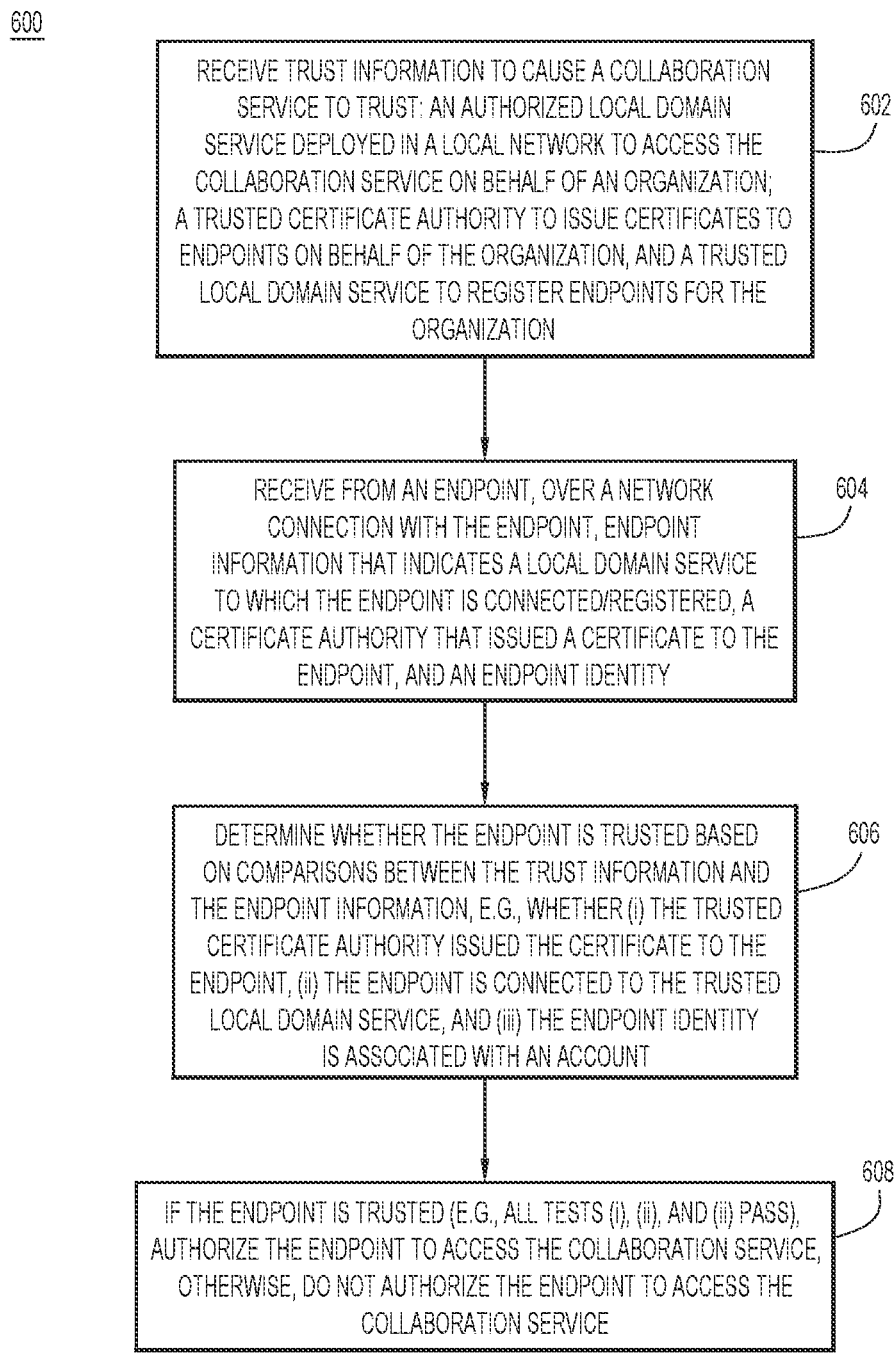
FIG. 6 is a flowchart of a method of zero-touch provisioning performed by the cloud service and that is executed in connection with the method of FIG. 5, according to an example embodiment.

With reference to FIG. 6, there is a flowchart of an example method 600 of zero-touch provisioning performed primarily by cloud service 104 on behalf of an organization. Method 600 is performed in connection with method 500.

At 602, cloud service 104 receives trust information from an administrator to cause the cloud service to trust: ALDS 112 to access the cloud service on behalf of the organization; a trusted certificate authority to issue certificates to endpoints; and a trusted local domain service for the organization.

Next operations 604-608 are performed in an automated fashion without manual/administrator intervention.

At 604, cloud service 104 receives from an endpoint, over a network connection with the endpoint that was initiated by the endpoint, endpoint information that indicates a local domain service to which the endpoint is registered/connected, a certificate authority that issued a certificate to the endpoint, and an endpoint identity.

At 606, cloud service 104 determines whether the endpoint is trusted based on comparisons between the trust information and the endpoint information.

At 608, if the endpoint is trusted, cloud service 104 authorizes the endpoint to access the cloud service, otherwise, the cloud service does not authorize the endpoint to access the cloud service.

Figure 7:
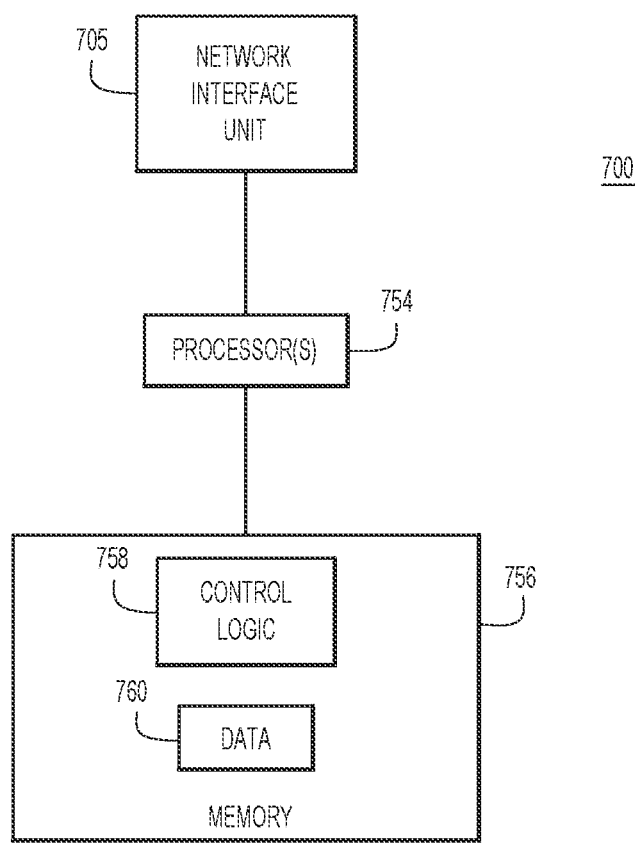
FIG. 7 is a block diagram of a computer system to host/implement the authorized local domain service deployed in the local network of the network environment or to host/implement the cloud service, according to an example embodiment.

With reference to FIG. 7, there is a block diagram of an example computer device 700 for hosting/implementing ALDS 112 as a stand-alone or integrated application, or for hosting/implementing cloud service 104. Computer device 700 includes network interface unit 705 to communicate with a wired and/or wireless communication network, a processor 754 (or multiple processors, which may be implemented as software or hardware processors), and memory 756. Network interface unit 705 may include an Ethernet card (or multiple such devices) including one or more network ports to connect with and communicate over wired Ethernet links and/or a wireless communication card including a wireless transceiver and an antenna to communicate over wireless links.

Memory 756 stores instructions for implementing methods described herein. Memory 756 may include read only memory (ROM), random access memory (RAM), magnetic disk storage media devices, optical storage media devices, flash memory devices, electrical, optical, or other physical/tangible (non-transitory) memory storage devices. The processor 754 is, for example, a microprocessor or a microcontroller that executes instructions stored in memory. Thus, in general, the memory 756 may comprise one or more tangible/non-transitory computer readable storage media (e.g., a memory device) encoded with software comprising computer executable instructions and when the software is executed (by the processor 754) it is operable to perform the operations described herein. When computer device 700 represents ALDS 112, memory 756 stores control logic 758 to perform operations of the ALDS described herein. When computer device 700 represents cloud service 104, memory 756 stores control logic 758, including APIs, to perform operations of the cloud service described herein. The memory 756 may also store data 760 used and generated by logic 758.

In summary, embodiments presented herein enable zero-touch cloud service (e.g., Teams) registration for an endpoint installer, with no administrator per-device pre-provisioning for both native (e.g., Webex Teams) endpoints and Cloud Aware endpoints connected to CUCM, Broadworks, VCS, and the like. This enables enterprises a completely frictionless rollout of cloud service (e.g., Webex Teams) endpoints (e.g. Webex Board and Webex Room Systems). Simply unbox and power up the endpoints, and they are automatically provisioned to work with clouds services, and users are able to pair with the endpoints to access the cloud services. This also enables a completely frictionless upsell of Webex Teams services to the existing fleet of deployed CUCM, Broadworks, and VCS endpoints. In both use cases, an administrator performs a one time network setup and configuration, and then all subsequent endpoint deployment is zero-touch by the administrator and the endpoint user.

In one form, a computer-implemented method is provided comprising: at an authorized local domain service deployed in a local network and authorized to provision endpoint devices with a cloud-based service on behalf of an organization: receiving, from a local domain service deployed in the local network and configured to connect with and register the endpoint devices in the local network for communications on behalf of the organization, an identity of an endpoint device among the endpoint devices, wherein the identity was acquired by the local domain service when the endpoint device registered with the local domain service; identifying for the organization an account associated with the identity of the endpoint device; creating in the cloud-based service for the organization an association between the identity of the endpoint device and the account; and notifying the endpoint device via the local domain service to onboard against the cloud-based service for access to the cloud-based service.

In another form, a system is provided comprising: a cloud-based service; an authorized local domain service deployed in a local network and authorized to communicate with the cloud-based service on behalf of an organization; and a local domain service deployed in the local network to register endpoint devices for communications on behalf of the organization; wherein the authorized local domain service is configured to: receive, from the local domain service, an identity of an endpoint device among the endpoint devices that is acquired by the local domain service when the endpoint device registered with the local domain service; identify for the organization an account associated with the identity; create in the cloud-based service for the organization an association between the identity and the account; and notify the endpoint device via the local domain service to onboard against the cloud-based service for access to the cloud-based service.

In yet another form, non-transitory computer readable storage media encoded with instructions are provided. The instructions, when executed by one or more processors, cause the one or more processors to perform operations including: at an authorized local domain service deployed in a local network and authorized to provision endpoint devices with a cloud-based service on behalf of an organization: receiving, from a local domain service deployed in the local network and configured to connect with and register the endpoint devices in the local network for communications on behalf of the organization, an identity of an endpoint device among the endpoint devices and that was acquired by the local domain service when the endpoint device registered with the local domain service; identifying for the organization an account associated with the identity of the endpoint device; creating in the cloud-based service for the organization an association between the identity of the endpoint device and the account; and notifying the endpoint device via the local domain service to onboard against the cloud-based service for access to the cloud-based service.

Further operations include further operations including, at the cloud-based service: receiving trust information indicating a trusted certificate authority to issue certificates to endpoint devices and a trusted local domain service for the organization; after the notifying, receiving from the endpoint device, over a network connection with the endpoint device, endpoint device information that indicates the local domain service, a certificate authority that issued a certificate to the endpoint device, and the identity of the endpoint device; determining whether the endpoint device is trusted based on comparisons between the trust information and the endpoint device information; and if the endpoint device is trusted, authorizing the endpoint device to access the cloud-based service, otherwise, not authorizing the endpoint device to access the cloud-based service.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at an authorized local domain service deployed in a local network and authorized to provision endpoint devices in the local network with a cloud-based service on behalf of an organization, the cloud-based service configured with trust information indicating a trusted certificate authority to issue certificates to the endpoint devices and a trusted local domain service:
      receiving, from a local domain service deployed in the local network and configured to connect with and register the endpoint devices for communications on behalf of the organization, an identity of an endpoint device among the endpoint devices, wherein the identity was acquired by the local domain service when the endpoint device registered with the local domain service;
      in a local network account database having entries for accounts associated with identities of the endpoint devices, identifying for the organization an account associated with the identity of the endpoint device;
      in a cloud-based account database of the cloud-based service that has parallel accounts for the accounts in the local network account database, automatically creating for the organization an association between the identity of the endpoint device and a parallel account for the account for the endpoint device; and
      notifying the endpoint device via the local domain service to onboard against the cloud-based service for access to the cloud-based service; and
   at the cloud-based service:
      receiving from the endpoint device, over a network connection, endpoint device information that indicates the local domain service, a certificate authority that issued a certificate to the endpoint device, and the identity of the endpoint device; and
      upon determining that the endpoint device is trusted based on comparisons between the trust information and the endpoint device information, authorizing the endpoint device to access the cloud-based service, otherwise, not authorizing the endpoint device for the access.

2. The method of claim 1, wherein the account is an individual account and the parallel account is a parallel individual account.

3. The method of claim 1, wherein the authorizing includes issuing, to the endpoint device, one or more access tokens to be used by the endpoint device to access services of the cloud-based service.

4. The method of claim 1, wherein the determining includes:
   testing whether (i) the trusted certificate authority issued the certificate to the endpoint device, (ii) the endpoint device is connected to the trusted local domain service, and (iii) the identity of the endpoint device is associated with the account; and
   determining the endpoint device is trusted when tests (i), (ii), and (iii) all pass, otherwise, determining the endpoint device is not trusted.

5. The method of claim 1, further comprising, at the local domain service:
   establishing an endpoint device-initiated Transport Layer Security (TLS) connection with the endpoint device over which the endpoint device registers with the local domain service; and
   issuing to the endpoint device over the TLS connection a certificate for the local domain service,
   wherein the receiving from the endpoint device the endpoint device information includes receiving from the endpoint device the certificate for the local domain service.

6. The method of claim 1, further comprising, at the cloud-based service:
   establishing the network connection with the endpoint device as an endpoint device-initiated Transport Layer Security (TLS) connection.

7. The method of claim 1, further comprising, at the cloud-based service:
   prior to automatically creating the association, receiving trust information to cause the cloud-based service to trust the authorized local domain service to perform actions, including automatically creating the association, on the cloud-based service on behalf of the organization.

8. The method of claim 1, wherein:
   the receiving includes receiving the identity of the endpoint device as a media access control (MAC) address of the endpoint device; and
   automatically creating includes creating the association as an association between the parallel account and the MAC address.

9. The method of claim 1, further comprising, at the authorized local domain service:
   prior to automatically creating the association, determining whether the parallel account exists in the cloud-based account database of the cloud-based service; and
   if the parallel account does not exist in the cloud-based account database, creating the parallel account in the cloud-based account database, and then performing automatically creating the association.

10. The method of claim 1, wherein:
    automatically creating includes creating a shared parallel account in the cloud-based account database of the cloud-based service for multiple users or multiple endpoint devices.

11. A system comprising:
    a cloud-based service configured with trust information indicating a trusted certificate authority to issue certificates to endpoint devices in a local network and a trusted local domain service for an organization;

an authorized local domain service deployed in the local network and authorized to communicate with the cloud-based service on behalf of the organization; and a local domain service deployed in the local network to register the endpoint devices for communications on behalf of the organization;

wherein the authorized local domain service is configured to:

receive, from the local domain service, an identity of an endpoint device among the endpoint devices that is acquired by the local domain service when the endpoint device registered with the local domain service;

in a local network account database having entries for accounts associated with identities of the endpoint devices, identify for the organization, an account associated with the identity;

in a cloud-based account database of the cloud-based service that has parallel accounts for the accounts in the local network account database, automatically create for the organization an association between the identity of the endpoint device and a parallel account for the account for the endpoint device; and notify the endpoint device via the local domain service to onboard against the cloud-based service for access to the cloud-based service; and wherein the cloud-based service is configured to:

receive from the endpoint device, over a network connection, endpoint device information that indicates the local domain service, a certificate authority that issued a certificate to the endpoint device, and the identity of the endpoint device; and upon determining the endpoint device is trusted based on comparisons between the trust information and the endpoint device information, authorize the endpoint device to access the cloud-based service, otherwise, not authorize the endpoint device for the access.

12. The system of claim 11, wherein the account is an individual account and the parallel account is a parallel individual account.

13. The system of claim 11, wherein the cloud-based service is configured to determine by:

testing whether (i) the trusted certificate authority issued the certificate to the endpoint device, (ii) the endpoint device is connected to the trusted local domain service, and (iii) the identity is associated with the account; and determining the endpoint device is trusted when tests (i), (ii), and (iii) all pass, otherwise, determining the endpoint device is not trusted.

14. The system of claim 11, wherein the local domain service is configured to:

establish an endpoint device-initiated Transport Layer Security (TLS) connection with the endpoint device over which the endpoint device registers with the local domain service; and issue to the endpoint device over the TLS connection a certificate for the local domain service, wherein the cloud-based service is configured to receive from the endpoint device the endpoint device information to include the certificate for the local domain service.

15. The system of claim 11, wherein the cloud-based service is further configured to:

establish the network connection with the endpoint device as an endpoint device-initiated Transport Layer Security (TLS) connection.

16. The system of claim 11, wherein the cloud-based service is further configured to:

prior to when the authorized local domain service is configured to automatically create the association, receive trust information to cause the cloud-based service to trust the authorized local domain service to perform actions, including automatically create the association, on the cloud-based service on behalf of the organization.

17. The system of claim 11, wherein the authorized local domain service is further configured to:

prior to when the authorized local domain service is configured to automatically create the association, determine whether the parallel account exists in the cloud-based account database of the cloud-based service; and if the parallel account does not exist in the cloud-based account database, create the parallel account in the cloud-based account database, and then automatically create the association between the parallel account and the identity.

18. Non-transitory computer readable storage media encoded with instructions that, when executed by one or more processors, cause the one or more processors to perform operations including:

at an authorized local domain service deployed in a local network and authorized to provision endpoint devices in the local network with a cloud-based service on behalf of an organization, the cloud-based service configured with trust information indicating a trusted certificate authority to issue certificates to the endpoint devices and a trusted local domain service:

receiving, from a local domain service deployed in the local network and configured to connect with and register the endpoint devices for communications on behalf of the organization, an identity of an endpoint device among the endpoint devices, wherein the identity was acquired by the local domain service when the endpoint device registered with the local domain service;

in a local network account database having entries for accounts associated with identities of the endpoint devices, identifying for the organization an account associated with the identity of the endpoint device;

in a cloud-based account database of the cloud-based service that has parallel accounts for the accounts in the local network account database, automatically creating for the organization an association between the identity of the endpoint device and a parallel account for the account for the endpoint device; and notifying the endpoint device via the local domain service to onboard against the cloud-based service for access to the cloud-based service; and at the cloud-based service:

receiving from the endpoint device, over a network connection, endpoint device information that indicates the local domain service, a certificate authority that issued a certificate to the endpoint device, and the identity of the endpoint device; and upon determining that the endpoint device is trusted based on comparisons between the trust information and the endpoint device information, authorizing the endpoint device to access the cloud-based service, otherwise, not authorizing the endpoint device for the access.

19. The non-transitory computer readable storage media of claim 18, wherein the account is an individual account and the parallel account is a parallel individual account.

20. The non-transitory computer readable storage media of claim 18, wherein the instructions to cause the one or more processors to perform the determining include instructions to cause the one or more processors to perform:
   testing whether (i) the trusted certificate authority issued the certificate to the endpoint device, (ii) the endpoint device is connected to the trusted local domain service, and (iii) the identity of the endpoint device is associated with the account; and
   determining the endpoint device is trusted when tests (i), (ii), and (iii) all pass, otherwise, determining the endpoint device is not trusted.

* * * * *